United States Patent
Luzaich et al.

(10) Patent No.: US 7,096,677 B2
(45) Date of Patent: *Aug. 29, 2006

(54) COMPACT PRESERVATION AND REFRIGERATION SYSTEM FOR PERISHABLE SUBSTANCES

(76) Inventors: Gregory J. Luzaich, 600 American Way, Windsor, CA (US) 95492; Teddy R Bryant, 1246 Grandview Rd., Sebastapol, CA (US) 95472

( * ) Notice: Subject to any disclaimer, the term of this patent is extended or adjusted under 35 U.S.C. 154(b) by 13 days.

This patent is subject to a terminal disclaimer.

(21) Appl. No.: 10/856,906

(22) Filed: Jun. 1, 2004

(65) Prior Publication Data

US 2004/0216467 A1    Nov. 4, 2004

Related U.S. Application Data

(63) Continuation-in-part of application No. 10/765,632, filed on Jan. 26, 2004.

(60) Provisional application No. 60/443,101, filed on Jan. 27, 2003.

(51) Int. Cl.
*F25B 21/02* (2006.01)
(52) U.S. Cl. .......................... 62/3.2; 62/457.8
(58) Field of Classification Search .................. 62/3.2, 62/3.6, 3.64, 78, 457.8, 457.4, 457.1; 53/79, 53/510; 141/37; 222/152
See application file for complete search history.

(56) References Cited

U.S. PATENT DOCUMENTS

| | | | | |
|---|---|---|---|---|
| 3,883,043 A | * | 5/1975 | Lane | 222/82 |
| 3,998,072 A | * | 12/1976 | Shaw | 62/457.4 |
| 4,011,971 A | * | 3/1977 | Haydon | 222/399 |
| 4,473,174 A | * | 9/1984 | Heuser | 222/152 |
| 4,475,576 A | | 10/1984 | Simon | |
| 4,477,477 A | * | 10/1984 | Arter | 426/330.4 |
| 4,518,104 A | | 5/1985 | Iannelli et al. | |
| 4,595,121 A | | 6/1986 | Schultz | |
| 4,681,611 A | | 7/1987 | Bohner | |
| 4,691,842 A | | 9/1987 | Foures | |
| 4,706,847 A | | 11/1987 | Sankey | |
| 4,735,348 A | * | 4/1988 | Santoiemmo et al. | 222/399 |
| 5,139,179 A | | 8/1992 | Cecil | |
| 5,148,682 A | * | 9/1992 | Wolf | 62/59 |
| 5,215,129 A | | 6/1993 | Berresford | |

(Continued)

FOREIGN PATENT DOCUMENTS

JP    2000-154956 A  *  6/2000

*Primary Examiner*—Mohammad M. Ali
(74) *Attorney, Agent, or Firm*—Michael E. Dergosits; Dergosits & Noah LLP

(57) ABSTRACT

A device for storage of an opened food container such as a wine container. The device includes a housing for receiving the opened food container in a substantially vertical orientation. A poppet valve assembly is provided for insertion in an opening in the opened food container and biased to enable it to accommodate opened food containers of varying sizes. The device includes a pressurized source of heaver-than-air inert gas located within the housing, a regulator for reducing the pressure of the inert gas from a first pressure at the pressurized source of the heavier-than-air inert gas to second pressure at the poppet valve assembly. The poppet valve assembly also includes a spring-loaded check ball, low-pass port, shuttle and orifice to control pressure and flow path of the heavier-than-air inert gas and to direct the heavier-than-air inert gas to the opened food container through a hollow tubular member that extends from the nozzle and into the food container thus displacing any air that may have been present therein through an exhaust port.

4 Claims, 8 Drawing Sheets

U.S. PATENT DOCUMENTS

| | | |
|---|---|---|
| 5,246,140 A | 9/1993 | Thix |
| 5,458,165 A | 10/1995 | Liebmann |
| 5,555,746 A * | 9/1996 | Thompson ................. 62/457.4 |
| 5,704,522 A * | 1/1998 | Orgeolet et al. ............ 222/494 |
| 5,971,200 A * | 10/1999 | Reynolds .................... 220/694 |
| 6,220,311 B1 * | 4/2001 | Litto ........................... 141/67 |
| 6,397,624 B1 * | 6/2002 | Horwell ..................... 62/457.8 |

* cited by examiner

SECTION A

SECTION A

SECTION B

SECTION C

SECTION D

SECTION E

SECTION B

COMPACT PRESERVATION AND REFRIGERATION SYSTEM FOR PERISHABLE SUBSTANCES

RELATED APPLICATIONS

The present application is a continuation in part of U.S. application Ser. No. 10/765,632 filed on Jan. 26, 2004 which claims benefit of provisional application 60/443101 filed Jan. 27, 2003.

TECHNICAL FIELD AND INVENTION

The present invention is directed to a device for the storage of an opened food container, such as an opened wine container or wine bottle. It has been recognized that food products such as wine and coffee, once opened and exposed to ambient air, oxidize thus changing their sought after characteristic taste. The present invention aids in the preservation of said food products and does so in a convenient compact package which can be completely self-contained or powered by an external power supply.

BACKGROUND OF THE INVENTION

Although the present invention will be described in terms of the preservation of wine, the invention can be extended to other food products such as coffee beans and ground coffee which similarly suffer ill effects when exposed to ambient (air) conditions.

Virtually anyone who routinely drinks wine notices that if a bottle of wine is uncorked and not completely consumed, the wine contained within the bottle changes in physical and chemical characteristics making the wine much less enjoyable to consume as time passes. This is caused by oxidation, that is, the bonding of oxygen molecules to oxidisable compounds present within the wine. Oxidation of wine results in the production of brown compounds and browning of red pigments with loss of color. It further results in the production of aldehydes and desirable grape (primary), fermentation (secondary) and aging (tertiary) derived flavors. The production of new undesirable flavor compounds can mask the desirable flavor compounds.

Such oxidisable compounds in wine include phenolics, alcohols and some flavor aldehyde compounds. Although all wines suffer from oxidation, because of the high concentration of phenolics extracted from grape skins during red wine production, red wine has a high reserve of oxidisable compounds and hence appears more sensitive to oxidative spoilage. Sulfur dioxide added to red wine loosely binds to red wine pigments decolorizing the pigment molecules and rendering a portion of the sulfur dioxide ineffective. Sulfur dioxide is also used to inhibit microbial growth and is thus a highly desirable additive for use in red wines.

It has thus been recognized that it is highly desirable to limit or entirely prevent oxygen, such as that contained in ambient air, from contacting the surface of a food product, such as wine, in order to maintain the product's desirable flavor and other physical characteristics.

There have been rather rudimentary attempts to inject an inert gas in the free space of an opened wine bottle in order to displace air contained therein. Such devices generally are in the form of a syringe-like product which enables the user to withdraw air from the bottle's free space or to inject a gas therein. However, such devices have proven to be ineffective in the flow of the inert gas to the free space above the wine and in removal of the ambient air to substantially reduce oxidation.

It is thus an object of the present invention to provide a device, in a simple small and compact housing through the use of a single external control switch to enable one to preserve food products, such as wine and coffee, from the ill effects of oxidation.

It is yet a further object of the present invention to provide a device such as that described above which can not only minimize oxidation but also control the food product's temperature, a desirable expedient in preserving food for an extended duration and to maintain the food product at its proper serving temperature.

These and further objects can be more readily appreciated when considering the following disclosure and appended drawings.

SUMMARY OF THE INVENTION

A device for storage of an opened food container. The device includes a housing for receiving the opened food container in a substantially vertical orientation. A poppet valve assembly is provided for insertion in an opening in the opened food container and biased to enable it to accommodate opened food containers of varying sizes. The device includes a pressurized source of heaver-than-air inert gas located within the housing, a regulator for reducing the pressure of the inert gas from a first pressure at the pressurized source of the heavier-than-air inert gas to second pressure at the poppet valve assembly. The poppet valve assembly also includes a spring-loaded check ball, low-pass port, shuttle and orifice to control pressure and flow path of the heavier-than-air inert gas and to direct the heavier-than-air inert gas to the opened food container through a hollow tubular member that extends from the nozzle and into the food container thus displacing any air that may have been present therein through an exhaust port.

DETAILED DESCRIPTION OF THE INVENTION

Device 10 is shown as a storage system in its preferred embodiment, capable of preserving a single, opened bottle of wine at a predetermined and controllable temperature appropriate for the food product being stored over an extended period of time. As noted previously, wine preservation is managed by the introduction of a gas or gas blend into the opened bottle of wine to displace air contained within the free space above the liquid and within the bottle thus eliminating or substantially reducing the oxidation that typically renders wine less desirable for consumption allowing it to be drinkable for an extended period of time. As will be noted below, storage temperatures can be managed through the use of a solid-state thermolectric heating and cooling system. Ideally, Device 10 can be composed of either metal or plastic.

Figure 1:
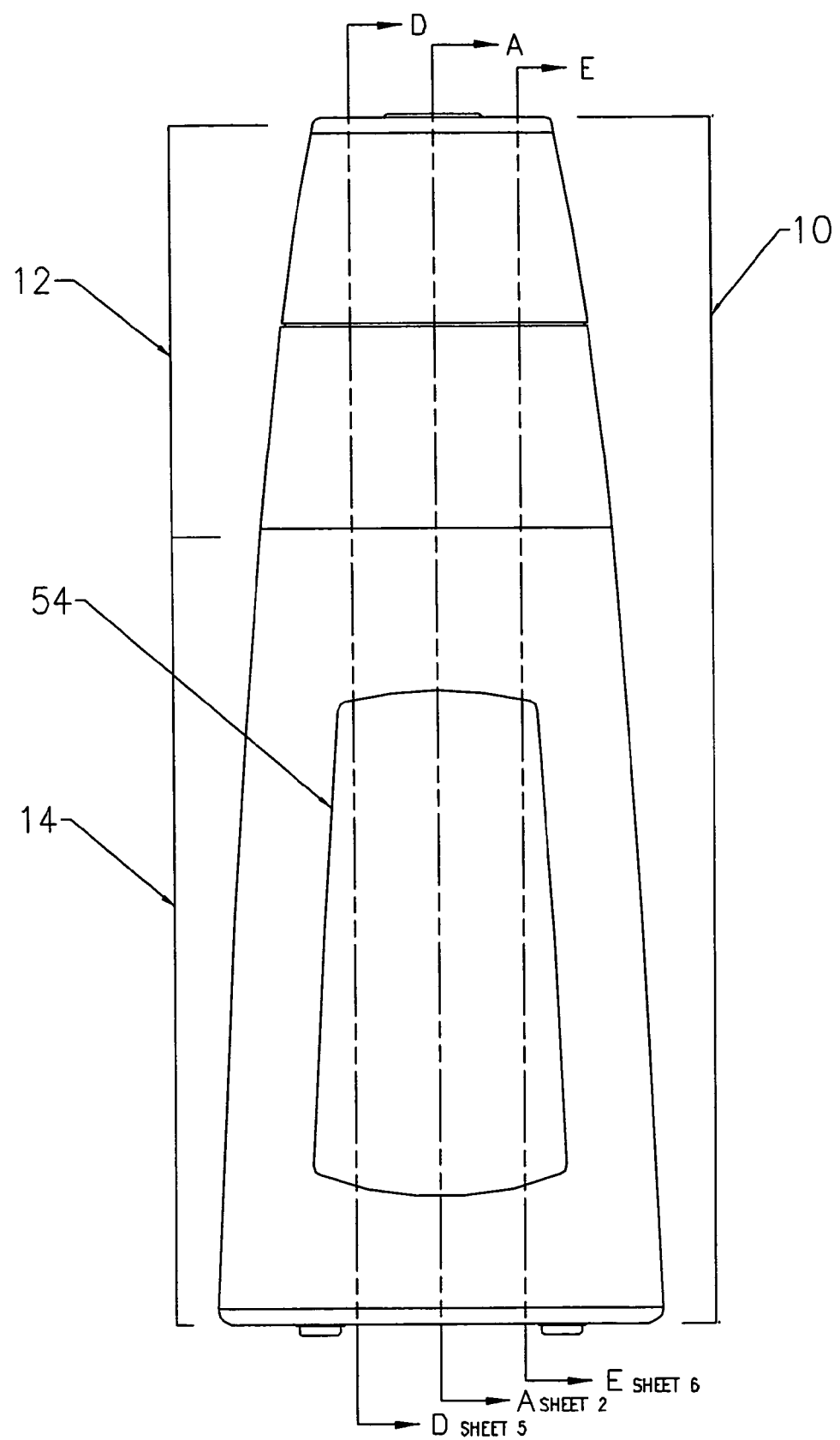
FIG. 1 is a side plan view showing the external housing of the presented device.

Turning again to FIG. 1, Device 10 is shown as constituting upper assembly 12 and lower assembly 14 and see-through window area 54 to enable one to view the food product container, such as a wine bottle label therethrough. In operation, the upper and lower assemblies can be separated enabling the user to place an opened bottle of wine in lower assembly 14. Once the bottle is in place, the assemblies are joined enabling one to begin the process of replacing air within the bottle with heavier-than-air inert gas such as argon to prevent or substantially reduce oxidation. Once the upper assembly has been installed into the lower assembly, the storage temperature can be set for the desired type of wine or other food product.

Figure 3:
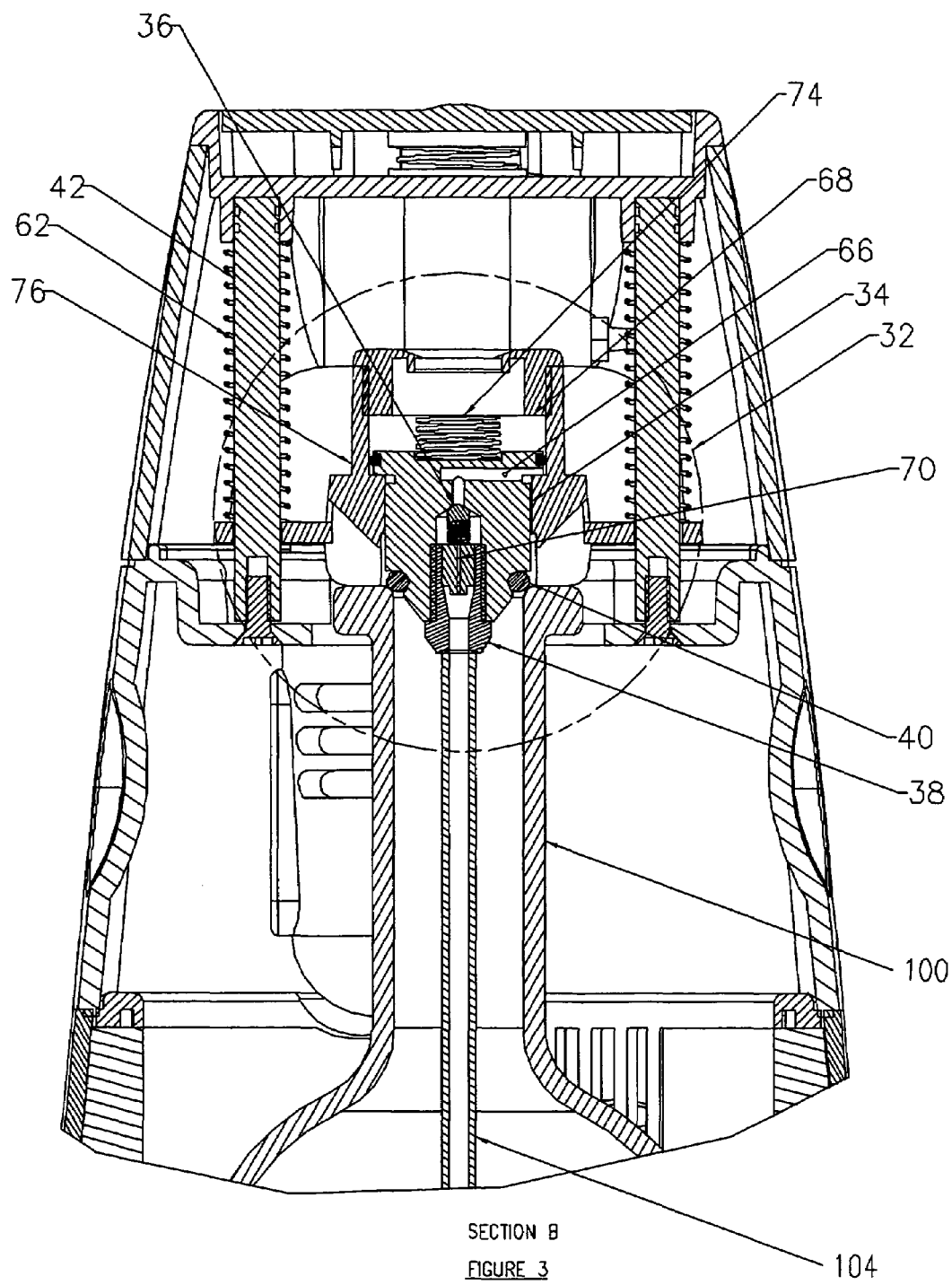
FIG. 3 is an expanded side cross-sectional view showing the details of a poppet valve assembly constituting a portion of the present invention in a closed shuttle orientation.
Figure 4:
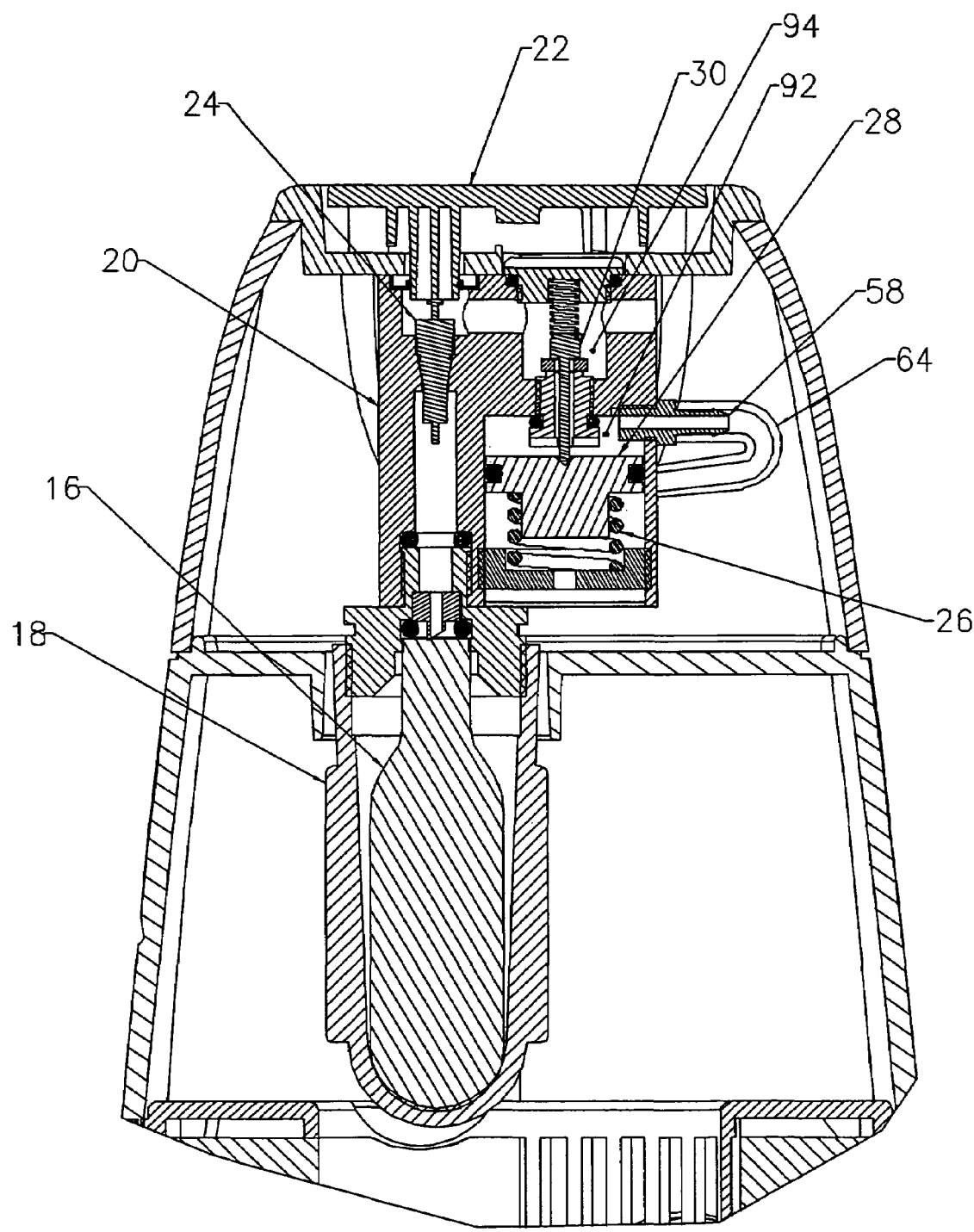
FIG. 4 is a further expanded side cross-section view showing the details of a compression valve assembly and assorted valve delivery devices constituting a portion of the present invention.

Turning to FIG. 4, the overall gas cartridge and delivery system can be best visualized. In doing so, activation lever 22 is provided in conjunction with replaceable gas cartridge 16 containing heavier-than-air inert gas. A threaded safety barrel 18 is shown attaching gas cartridge 16 to gas pressure regulator assembly 20. Once the upper assembly is placed onto lower assembly 12 (FIG. 1) poppet valve assembly 32 (FIG. 3) is displaced vertically to accommodate variations in bottle height.

Figure 2:
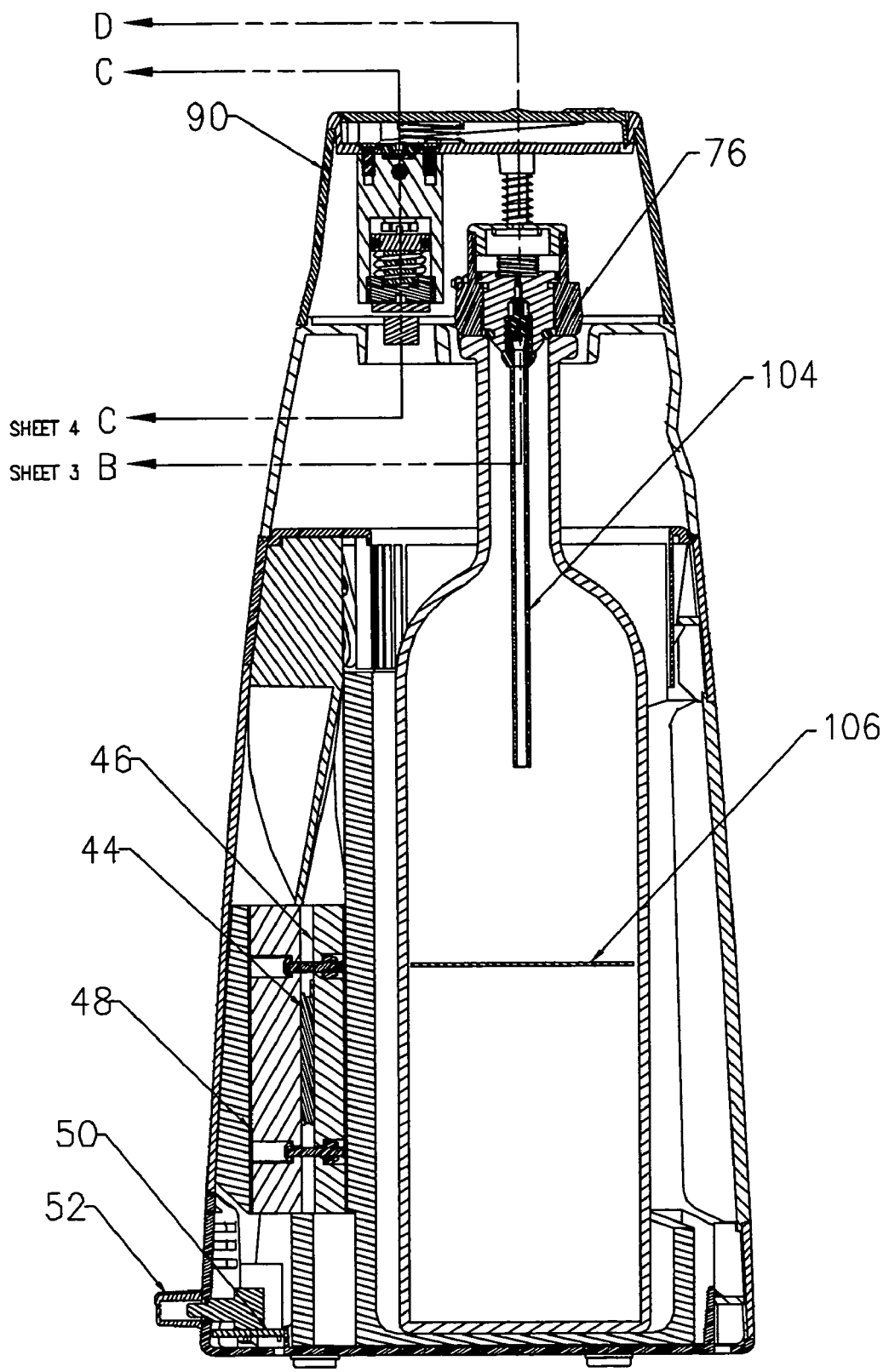
FIG. 2 is side cross-sectional view taken along sectional line A—A of FIG. 1.

Poppet valve assembly 32 essentially floats in a predetermined range to accept most wine bottle heights. To facilitate this, poppet valve assembly 32 is mounted on guide pins 42 wherein poppet valve body 76 contacts the bottle to perform compensation for varying bottle height and remains in contact with the bottle opening as long as bottle remains within this device as shown in FIG. 2. Poppet valve assembly 32 is spring-loaded by providing two springs 62 located axially about poppet valve guide pins 42.

In operation, by depressing lever 22 air valve 24 is depressed allowing high pressure gas stored in replaceable gas cartridge 16 to flow to pressure regulation chamber 92. The gas pressure regulator is composed of counter-balance spring 26, piston 28 and flow control needle 30. In combination, these elements reduce the high pressure in the range of 1000-to-2500psi to a preferred operating pressure of approximately 15-to-20psi. It is noted that low-pressure exits from the regulator section 92 via flexible tube 64 and port 58.

Figure 7:
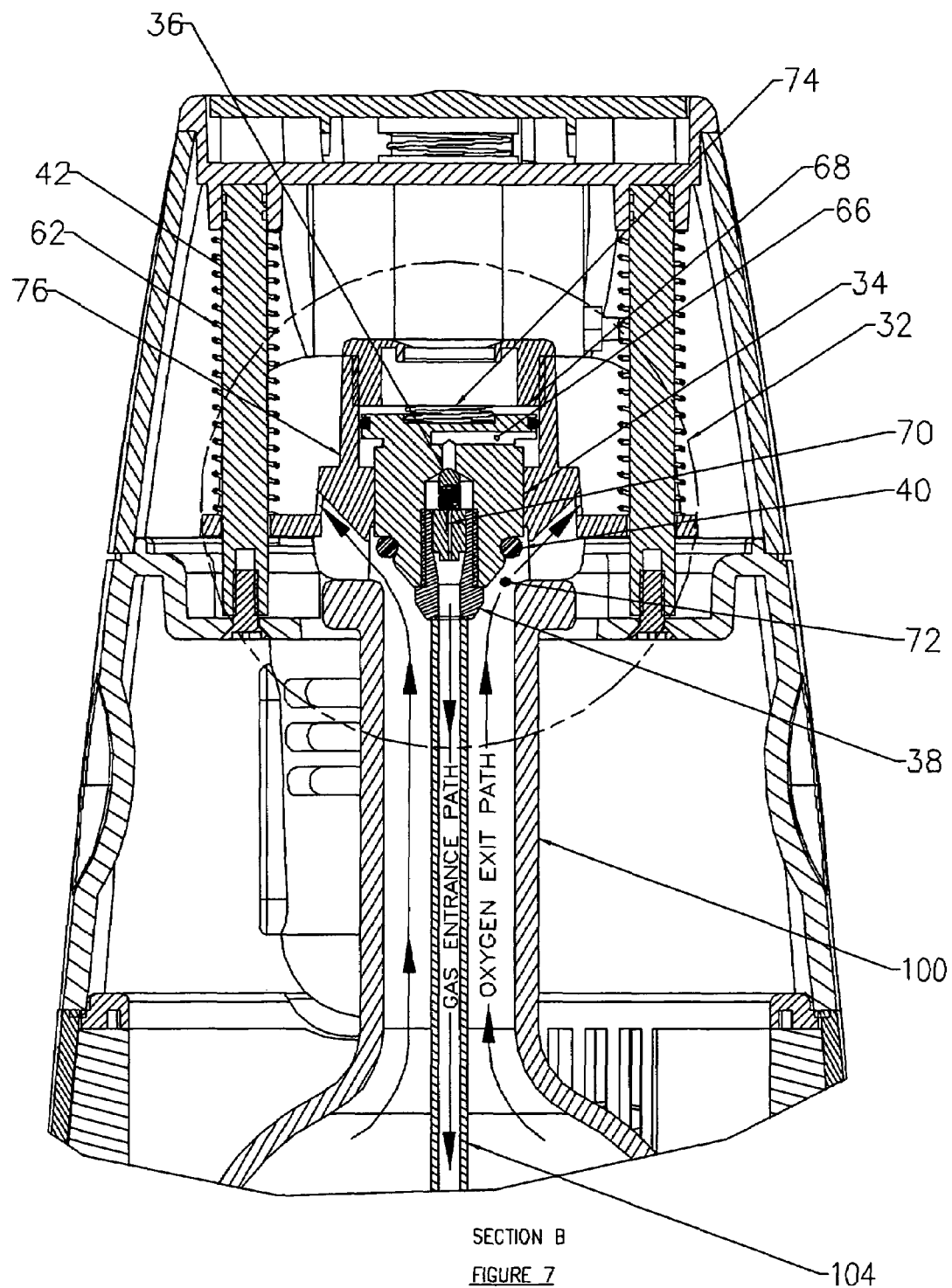
FIG. 7 is an expanded side cross-sectional view showing the details of a poppet valve assembly in an open shuttle orientation.

Once in flexible tube 64, the heavier-than-air inert gas is directed to poppet valve assembly 32 (FIG. 3) which, as noted sits atop neck 100 of wine bottle 1. Heavier-than-air inert gas enters poppet valve assembly 32 through low-pass port 66. A spring-loaded check ball 36 forces pressure to build in low-pass port 66 forcing shuttle 34 upward until it reaches vertical stop 68 noting that poppet valve body remains in contact with bottle 1 at all times. As the shuttle rises, access to gas exit path 72 (FIG. 7) is created at the top of the bottle. Once the shuttle hits its stop, the pressure in low-pass port 66 increases until check ball 36 is unseated. Gas then flows by check ball 36 through orifice 70 and is exhausted through nozzle 38 and subsequently through tube 104. As noted, although shuttle 34 vertically rises upon the introduction of heavier-than-air inert gas to neck 100 of bottle 1, valve body 76, which is preferably perforated to enable air to escape from bottle 1, remains in contact with the bottle at its neck 100.

It is noted that orifice 70 causes reduction in overall gas flow rate. This reduced area orifice can be eliminated if the size of nozzle 38 is reduced in diameter. This nozzle is designed such that gas remains in a concentrated stream that disburses very little as it enters neck 100 of wine bottle 1 and through tube 104. Once heavier-than-air inert gas confronts the liquid contained within the bottle, the gas disperses at the surface of the liquid, thus displacing air with the heavier-than-air inert gas. As the inert gas continues to inject in bottle 1 at neck 100, the surface level of the inert gas rises and eventually displaces any air which was otherwise contained within the bottle, removing the oxygen content responsible for oxidation and thus spoilage of the wine or other food product. In other words, the inert gas collects at the bottom of the free space above the liquid and pushes existing air out of bottle 1. As the inert gas is chosen to have a molecular weight higher than air, it will remain below air as the air is pushed out of the bottle. In doing so, air otherwise contained within the bottle exits the bottle through poppet exhaust port 72 and exits the housing through exhaust housing vent port 90. In employing tube 104, commingling of the inert gas and oxygen in the neck or nozzle region of the bottle is significantly reduced.

Once lever 22 atop present device 10 is released, gas pressure to gas pressure regulation chamber 92 is interrupted and gas pressure to poppet valve assembly 32 is eliminated and shuttle 34 is forced against mouth 101 by spring 74. Gasket 40 on shuttle 34 seals bottle 100 to prevent gas from escaping, thus preserving the bottle contents beneath an atmosphere of the heavier-than-air inert gas noting that check ball 36 prevents backflow of either oxygen or inert gas.

Figure 2A:
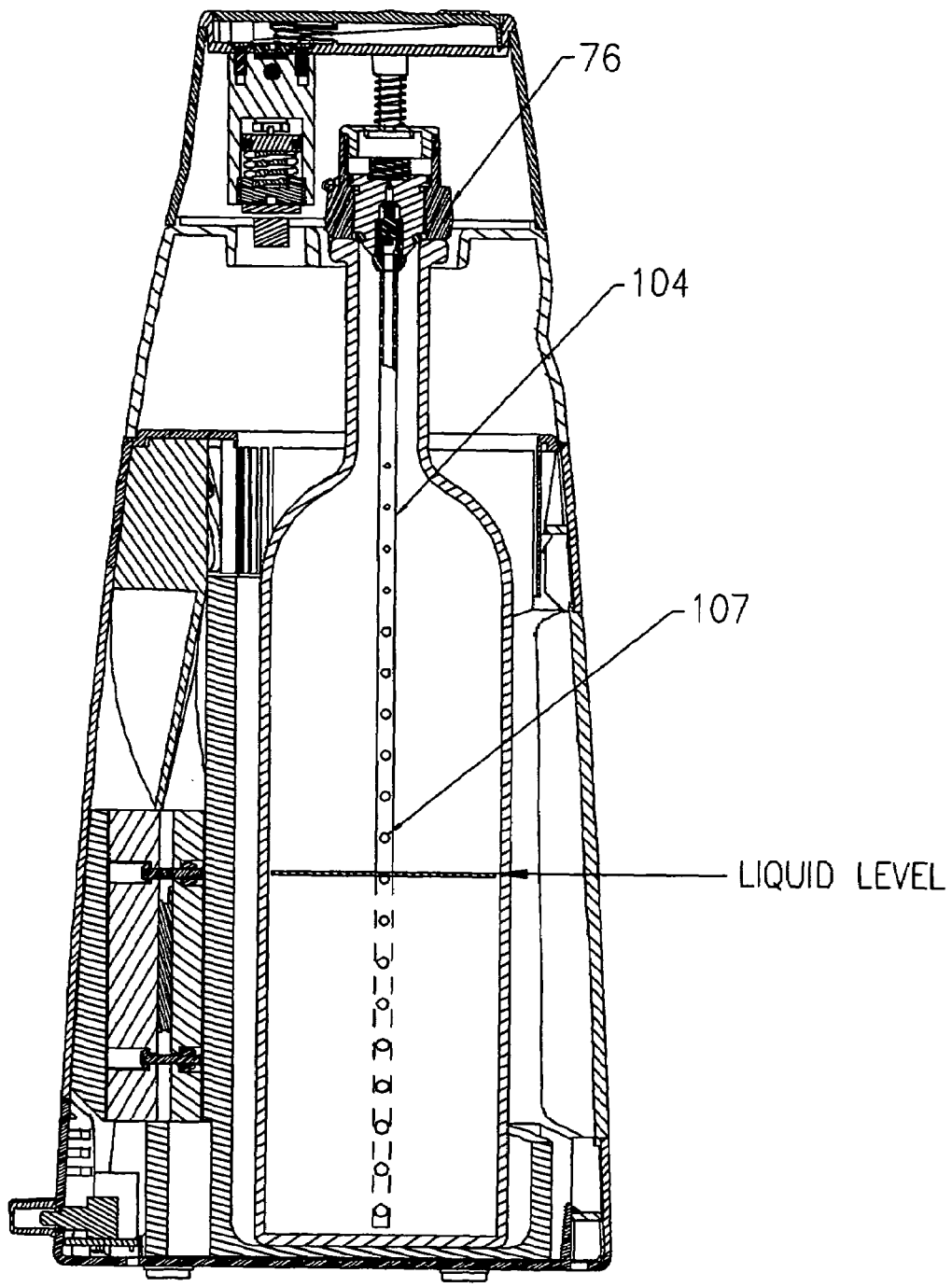
FIG. 2A is a side cross-sectional view showing the placement of the present hollow tubular member to depiction of the invention made in FIG. 2.

The present invention is an improvement over parent application Ser. No. 10/765,632 through the inclusion of hollow tubular member 104. It has been found to be a preferred expedient to situate hollow tubular member 104 having a diameter and longitudinal axis as shown in FIG. 2A which can be frictionally fit within nozzle 38 for directing heavier-than-air inert gas within the confines of the open food container or, in this instance, the wine bottle as depicted. In doing so, the heavier-than-air inert gas can be directed closer to the meniscus level of the wine and away from the poppet valve assembly thus providing for decreased turbulence and more effective venting of oxygen contained within the open space above the liquid level. When dealing with traditional 750 ml wine bottles, hollow tubular member 104 should ideally be sized to extend within the open wine bottle a distance of approximately 4 inches which would typify the liquid level of wine once a single glass has been decanted. It is anticipated that the present invention would only be used in the event that the wine bottle was opened and, typically, one would not open and store wine in a bottle unless at least a single glass was decanted. Hollow tubular member 104 could, however, extend along this longitudinal axis the full anticipated height of a typical 750 ml wine bottle as shown in FIG. 2A.

As yet a further preferred embodiment, hollow tubular member 104 could be characterized as having a series of perforations 107 extending substantially along its longitudinal axis. It is anticipated that heavier-than-air inert gas being introduced to hollow tubular member 104 through orifice 70 and nozzle 38 would feed this gas to the interior of the food container through perforations 107 to enhance the operation of the present invention. In doing so, dispensing of a heavier-than-air inert gas, in seeking a path of least resistance, would tend to exit the interior of hollow tube 104 through larger orifices. As such, as again shown in FIG. 2A, perforations 107 are characterized as being larger as the hollow tubular member extends away from orifice 70 in nozzle 38.

Figure 5:
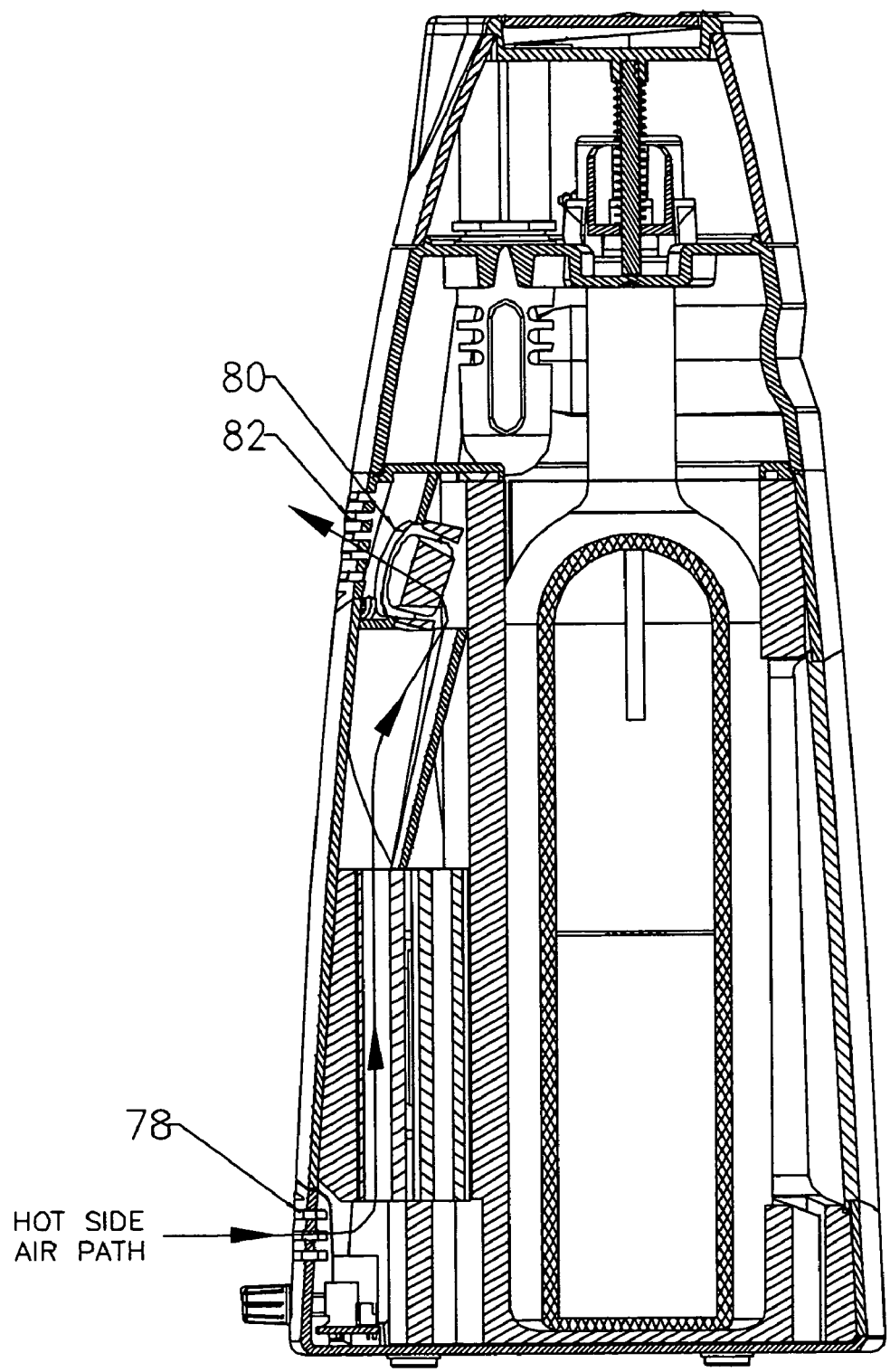
FIG. 5 is a side cross-sectional view taken along line D—D of FIG. 1.
Figure 6:
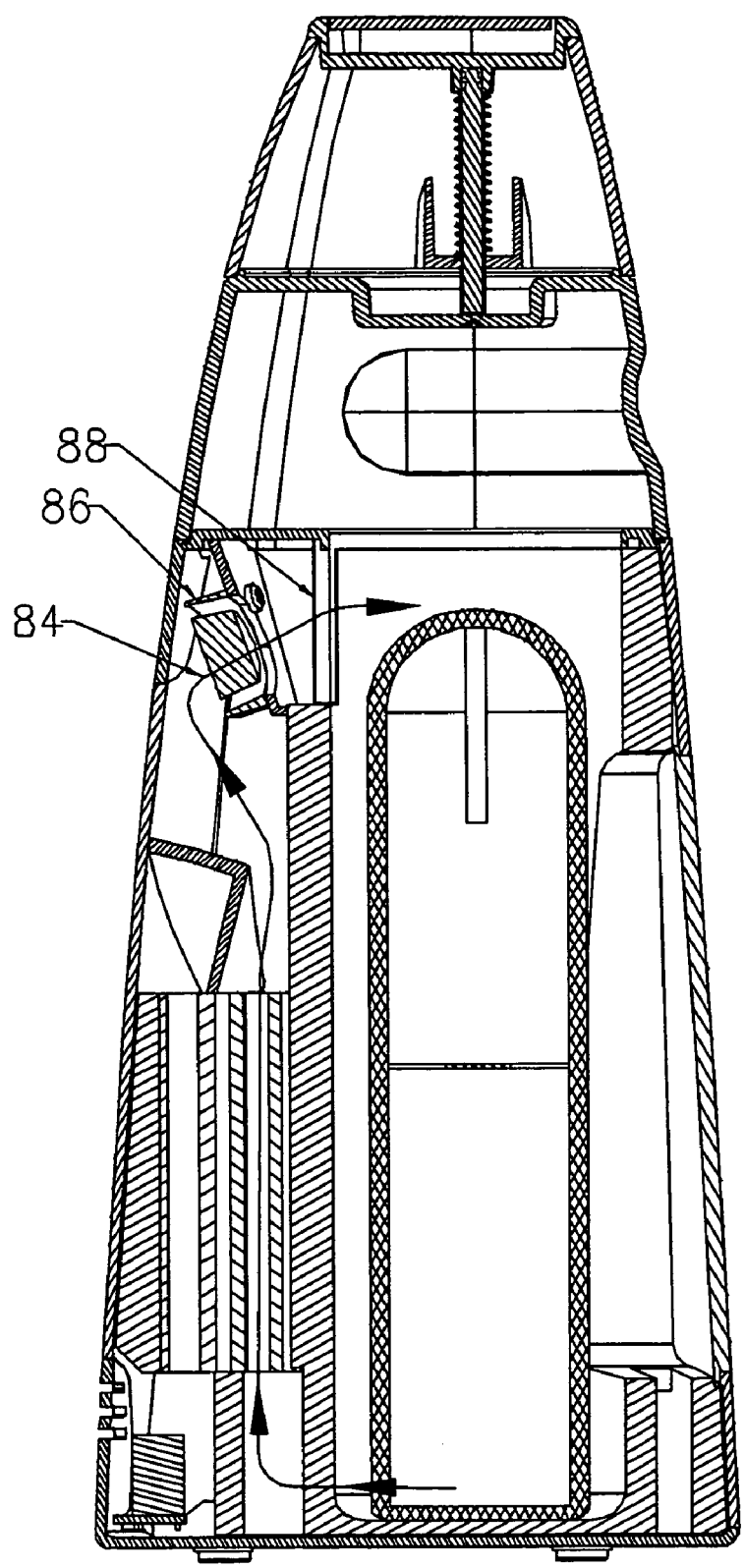
FIG. 6 is a side cross-sectional view of the present invention taken along line E—E of FIG. 1.

As noted previously, the compact packaging of the present invention further contemplates employing a cooling system to maintain the storage temperature of the food product. Reference is made to FIGS. 2, 5 and 6 showing thermolelectric cooler 44 creating a temperature differential between two separate forced air circuits. The two circuits are thermally separate as "cold air" and "hot air" circuits. Wine bottle 1 is placed in the closed loop cold air circuit. Thermolelectric cooler 44 extracts heat from the cold air circuit and transfers it to the hot air circuit where it is exhausted to the atmosphere.

In operation, the hot side circuit draws ambient air through entrance port 78. The air is then drawn over the hot side heat sink 48 where it becomes heated due to the convective heat transfer from the hot heat sink to ambient air. The air is then drawn through hot-side fan 80 and exhausted through hot-side exhaust port 82.

As noted, cooling is provided through the use of a cool-air circuit as a closed loop system cooling the food product contained within the device of the present invention. Air is drawn through cold-air return port 84 and is then drawn over cold-side heat sink 46 where it is cooled. The cold air subsequently passes through cold-air fan 86 and is exhausted into the bottle compartment through cold-air exhaust port 88. The cold air cools the bottle compartment noting that a thermistor in the cold air circuit is coupled with a potentiometer mounted on printed circuit board 50 to control the power of thermolelectric cooler 44 which in turn determines the temperature in the cold air circuit. This provides thermostatic control of the wine bottle temperature. A knob attached to potentiometer 52 allows for adjustment of the storage temperature.

As noted previously, although the present invention has been described in terms of preserving wine contained within a wine bottle as a preferred embodiment, this invention can also be employed for preserving other food products which are sensitive to the oxidative effects of ambient air. For example, coffee beans and ground coffee would benefit greatly through the use of the present invention.

We claim:

1. A device for storage of an opened wine container comprising a housing for receiving said opened wine container in a substantially vertical orientation, a poppet valve assembly including a valve body for insertion within an opening in said opened wine container and biased to enable said device to accommodate opened wine containers of varying sizes, a pressurized source of heavier-than-air inert gas located within said housing, a regulator for reducing the pressure of said inert gas from a first pressure at said pressurized source of heaver-than-air inert gas to a second pressure at said poppet valve assembly, said poppet valve assembly further comprising a spring-loaded check ball, low-pass port, shuttle and orifice to control pressure and flow path of said heavier-than-air inert gas as it enters said opened wine container and to direct said heavier-than-air inert gas to said opened wine container and for displacing any air that may have been present therein through an exhaust port further made part of said poppet valve assembly, further comprising a hollow tubular member having a diameter and longitudinal axis and a series of perforations extending substantially along said longitudinal axis, said hollow tubular member extending from said nozzle and into said wine container for carrying said heavier-than-air inert gas from said nozzle and into said wine container through said perforations.

2. The device of claim 1 wherein said hollow tubular member is characterized as having a diameter for frictionally fitting within said orifice.

3. The device of claim 1 wherein said hollow tubular member is characterized as having a length taken along its longitudinal axis a distance measured from said orifice to an anticipated level of wine contained within said open wine container once a single glass has been decanted therefrom.

4. A device of claim 1 wherein said series of perforations are further characterized as being larger as said hollow tubular member extends away from said orifice.

* * * * *